Patented Mar. 21, 1939

2,151,459

UNITED STATES PATENT OFFICE 2,151,459

DERIVATIVES OF 3,4-DIHYDROXYPHENYL-AMINOPROPANOLS

Max Bockmühl, Gustav Ehrhart, and Leonhard Stein, Frankfort-on-the-Main, Germany, assignors to Winthrop Chemical Company, Inc., New York, N. Y., a corporation of New York No Drawing. Application June 27, 1936, Serial No. 87,800. In Germany July 14, 1935

3 Claims. (Cl. 260—572)

The present invention relates to derivatives of 3,4-dihydroxyphenylaminopropanol.

It is known that dihydroxyphenylpropanolamine is a compound displaying an effect analogous to that of 3,4-dihydroxyphenylmethylaminoethanol without, however, possessing its secondary effect.

We have found that compounds of the general constitution:

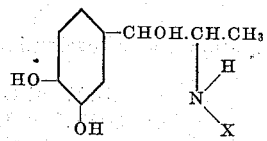

wherein X stands for an aliphatic hydrocarbon radical with at least two carbon atoms or for a cycloaliphatic hydrocarbon radical, have an action on the heart analogous to that of 3,4-dihydroxyphenylmethylaminoethanol, but surprisingly scarcely affect the blood pressure.

Thus there is obtained, for instance, the 3,4-dihydroxyphenylalkylaminopropanol-1 by bromination of 3,4-dihydroxypropiophenone, preferably after a previous benzylation and substitution of the bromine by the alkylamine group and reduction of the alkylamine ketone thus obtained.

The following examples serve to illustrate the invention, but they are not intended to limit it thereto:

(1) 104 grams of 3,4-dibenzyloxypropiophenone are dissolved in 300 cc. of methylene chloride and mixed, drop by drop, with 48 grams of bromine. When the bromination is complete the liquid is concentrated under reduced pressure and the residue is mixed with 200 cc. of an alcoholic ethylamine solution of 15 per cent. strength. After a reaction lasting for several hours the whole is mixed with ether and the ethylamine hydrobromide formed during the reaction is precipitated and filtered with suction. The filtrate obtained is then shaken with 500 cc. of hydrochloric acid of 10 per cent. strength, the 3,4-dibenzyloxyethylaminopropiophenone hydrochloride being obtained in an oily form in the separating funnel. The oil is separated, dissolved in about 400 cc. of alcohol and the alcoholic solution is hydrogenated with palladium and hydrogen. When the absorption of hydrogen is complete, the catalyst is eliminated by filtering with suction and the alcoholic filtrate is concentrated under reduced pressure. The residue is dissolved in 200 cc. of water and the 3,4-dihydroxyethylaminopropiophenone is precipitated in a crystalline form from the hydrochloric acid solution by means of ammonia. The keto base obtained melts at 169° C. to 170° C. with decomposition. The 3,4-dihydroxyethylaminopropiophenone thus obtained is dissolved in the calculated amount of hydrochloric acid, diluted with water and again hydrogenated with palladium and hydrogen. After the absorption of the calculated amount of hydrogen the catalyst is removed by filtering with suction, the aqueous solution is concentrated under reduced pressure and the crystalline residue is recrystallized from methanol with addition of ether. The 3,4-dihydroxyphenylethylaminopropanol hydrochloride melts, after recrystallization, at 211° C. with decomposition.

(2) 64 grams of 3,4-dibenzyloxypropiophenone are dissolved in 250 cc. of methylene chloride and mixed after addition of 30 grams of calcium carbonate, drop by drop, with 30 grams of bromine. The liquid obtained after the reaction is filtered, washed with ice water, dried over sodium sulfate and concentrated in a vacuum. The 3,4-dibenzyloxybromopropiophenone which remains is dissolved in 100 cc. of alcohol and directly caused to react with 55 grams of benzylpropylamine. The solution is allowed to stand over night and then mixed with such an amount of ether that the benzylpropylamine hydrobromide formed during the reaction precipitates. The whole is filtered with suction and the filtrate obtained is shaken with an excess of hydrochloric acid of 10 per cent. strength, the 3,4-dibenzyloxybenzylpropylaminopropiophenone hydrochloride being obtained in an oily form in the separating funnel. The oily hydrochloride is separated, dissolved in about 350 cc. of alcohol and hydrogenated with palladium and hydrogen. When the absorption of hydrogen is complete, the catalyst is eliminated by filtering with suction and the alcoholic filtrate is evaporated in a vacuum. The non-crystalling residue is dissolved in 300 cc. of water and, after decolorization with animal charcoal, the aqueous solution is again hydrogenated with palladium and hydrogen. As soon as the absorption of hydrogen has ceased the catalyst is removed by filtering with suction and the aqueous filtrate is dried under reduced pressure. The crystalline residue is recrystallized from a mixture of methanol and acetone. The 3,4-dihydroxyphenylpropylaminopropanol hydrochloride decomposes at 210° C.

(3) 25 grams of 3,4-dibenzyloxypropiophenone are dissolved in 100 cc. of methylene chloride and caused to react, drop by drop, with 11.6 grams of bromine. The residue obtained after the distillation of the solvent is transformed in an alcoholic solution with the calculated amount of cyclopentylamine. After one day's standing the alcoholic solution is mixed with ether, first washed with water and then shaken with 200 cc. of dilute hydrochloric acid, the 3,4-dibenzyloxycyclopentylamidopropiophenone hydrochloride being obtained in the form of an oil at the bottom of the separating funnel. The feebly yellowish oil is separated, diluted with about 300 cc. of alcohol and hydrogenated with palladium and hydrogen. When the absorption of hydrogen is complete the alcoholic solution is concentrated in a vacuum and the residue is dissolved in water, rendered alkaline with the aid of ammonia and the product which crystallizes is filtered with suction. The 3,4-dihydroxycyclopentylaminopropiophenone obtained is dissolved in dilute hydrochloric acid, diluted with about 200 cc. of water and hydrogenated with palladium and hydrogen. After absorption of the calculated amount of hydrogen, the catalyst is eliminated by filtering with suction, the aqueous solution is concentrated in a vacuum and the crystalline residue is recrystallized from methanol with addition of ether. The 3,4-dihydroxyphenylcyclopentylaminopropanol hydrochloride melts at 215° C. with decomposition.

(4) In a manner analogous to that of Example 3 the 3,4-dihydroxyphenylcyclohexylaminopropanol hydrochloride is obtained by causing 3,4-dibenzyloxybromopropiophenone to react with cyclohexylamine and subsequently hydrogenating. It melts at 242° C. with decomposition.

We claim:

1. As a new product the compound of the following formula:

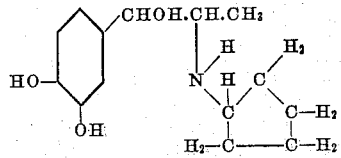

said product having valuable therapeutic properties.

2. As a new product the compound of the following formula:

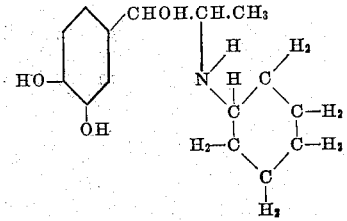

said product having valuable therapeutic properties.

3. As new products the compounds of the following general formula:

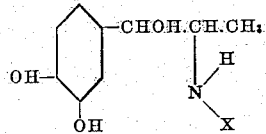

wherein X stands for a cycloaliphatic hydrocarbon radical.

MAX BOCKMÜHL.
GUSTAV EHRHART.
LEONHARD STEIN.